United States Patent [19]
Waters

[11] Patent Number: 5,666,749
[45] Date of Patent: Sep. 16, 1997

[54] AUTOMOBILE PLATE PROTECTOR AND DISPLAY APPARATUS

[76] Inventor: Ronnie Waters, 604 Jake Brown Rd., Richmond Hill, Ga. 31324

[21] Appl. No.: 528,390

[22] Filed: Sep. 14, 1995

[51] Int. Cl.⁶ ............................................. G09F 13/02
[52] U.S. Cl. ...................................... 40/204; 40/574
[58] Field of Search ........................ 40/204, 205, 574

[56] References Cited

U.S. PATENT DOCUMENTS

| | | | |
|---|---|---|---|
| 1,229,483 | 6/1917 | Libby | 40/205 X |
| 1,274,899 | 8/1918 | Kretz | 40/205 |
| 1,457,206 | 5/1923 | Benjamin | 40/204 |
| 1,520,257 | 12/1924 | Morlan et al. | 40/205 |
| 1,535,823 | 4/1925 | Goodwin. | |
| 2,562,740 | 3/1951 | Rizer. | |
| 2,618,089 | 11/1952 | Rose. | |
| 3,038,271 | 6/1962 | MacHutchin et al.. | |
| 3,188,761 | 6/1965 | Harrold. | |
| 4,424,449 | 1/1984 | O'Brill. | |
| 4,475,298 | 10/1984 | Munoz | 40/546 |
| 4,744,012 | 5/1988 | Bergkvist. | |
| 4,903,423 | 2/1990 | Hinca. | |
| 5,073,842 | 12/1991 | Monroe. | |
| 5,150,960 | 9/1992 | Redick. | |
| 5,177,889 | 1/1993 | Hwei | 40/204 |
| 5,255,166 | 10/1993 | Gonzalez. | |
| 5,339,550 | 8/1994 | Hoffman | 40/544 |
| 5,373,428 | 12/1994 | Day | 40/574 |
| 5,444,931 | 8/1995 | Hillstrom | 40/574 X |

*Primary Examiner*—Joanne Silbermann
*Attorney, Agent, or Firm*—Bernstein & Associates

[57] ABSTRACT

An automobile display plate protector and display assembly comprises a rear mounting box capable of being affixed directly onto an automobile license plate receiving mount and having a reflective interior surface, at least one light bulb mounted within the box by a standard light bulb fixture, a means for providing electrical power to bulb comprising a wire connected to a power source, and a shield assembly comprising an inner translucent shield and an outer translucent shield plate capable of receiving an automobile license plate intermediate to them, the inner and outer shield plates are outwardly bowed thereby forming a curved rather than a flat front surface, and the shield assembly being attachable to the box.

10 Claims, 4 Drawing Sheets

AUTOMOBILE PLATE PROTECTOR AND DISPLAY APPARATUS

FIELD OF THE INVENTION

The present invention relates to mounting and display devices for automobile license plates. More specifically, this invention relates to a device which protects and illuminates automobile license plates.

BACKGROUND OF THE INVENTION

In states which do not require front automobile license plates, a dealership will often place a promotional plate with the name and address of the dealership on its front. In addition, the automobile owner may wish to place some type of front plate onto the car following purchase, containing such material as a college name, team logo, etc. In many cases it is desirable to construct these plates of low cost material, enabling them to be retailed inexpensively. Alternatively, an automobile owner may wish to place air-brush art in the license plate slot, such art is highly susceptible to damage from exposure to the natural elements. It is also desirable that a lighted element be included so that the plate may be viewed in both daytime and nighttime conditions. This is not possible in a simple open-mounted configuration because 1) the plate will be exposed to severe conditions such as rain and dirt from the road, lightweight or painted materials being less able to withstand these irritants, and 2) lighting elements tend to induce "hot spots" on the plate surface which may burn some lightweight or painted materials. Further, it would be desirable if the illumination system could be powered directly from the automobile electrical system, thus eliminating the need for the owner to periodically replace batteries.

SUMMARY OF THE INVENTION

The present invention relates to a mounting and display device for automobile license plates. In the preferred embodiment, the device is mountable directly to the automobile within the preexisting mounting assembly which usually consists of a slight indentation into the automobile fender and two grooved passages sized to fit accompanying bolts. This invention provides both a front and back transparent plastic (or other suitable material) shield in which the plate is sandwiched. This solves the problem of damage to the plate caused by the driving environment because the transparent material is impact resistant. This allows extremely lightweight material to be used to construct the plate. The rearmost element of the invention is a low profile rectangular box containing one or more electric lights. The circuitry is configured such that power requirements may be met directly from the automobile electrical system via a wire extending from the rear of the box. The interior of the box is colored white or other highly reflective hue. The above-mentioned front and back transparent shields are capable of being secured directly to the thin rectangular box by means of the four lag bolts standard on most automobiles.

Another key element of the present invention is the outwardly bowed shape of the transparent protective elements. This outwardly bowed shape allows for even illumination of the license plate surface and thereby prevents "hot spots," or small areas of high illumination.

Accordingly, it is a principal object of the present invention to provide a device for mounting and displaying a license plate on an automobile.

It is another object of this invention to employ transparent protective shields in which a license plate may be sandwiched.

It is another object of this invention to outwardly bow the plastic shields to allow for even illumination and ease of visibility of the plate.

It is another object of this invention to employ an illuminating element which allows the plate to be viewed in darkness.

It is a further object of the invention to provide electrical power for the illuminating element directly from the automobile electrical system.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENT

Figure 1:
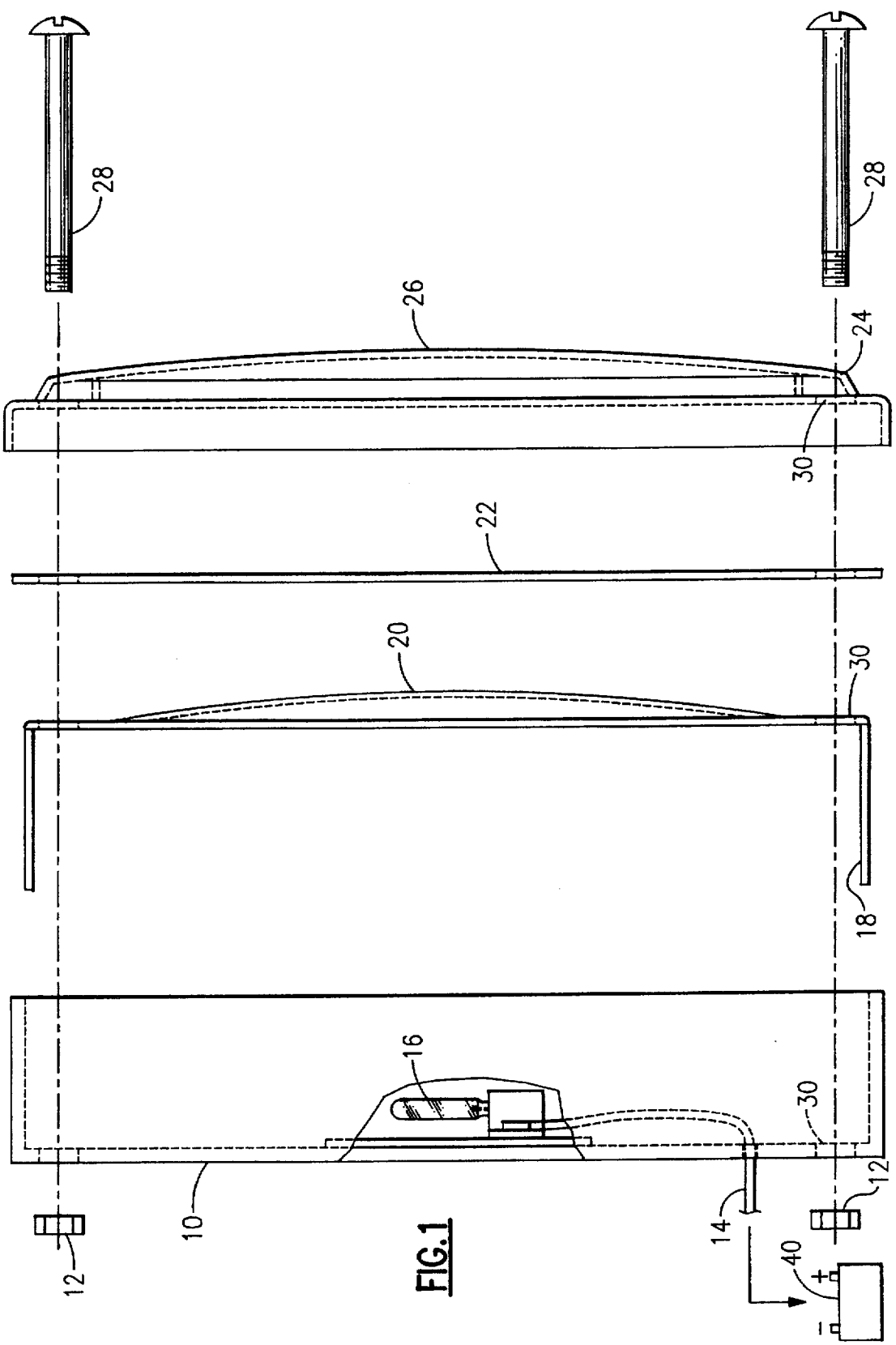
FIG. 1 is an exploded side view of the present invention.

FIG. 1 shows an exploded view of the entire mounting and display assembly. Rear mounting box 10 is configured to bolt directly onto an automobile via the pre-drilled license plate holes 12. Wire 14 is of a type which may be received directly by a standard automobile electrical system. Wire 14 is attached to an illuminating means 16 which is fixed within the interior of rear mounting box 10 by standard light fixtures 17. Inner shield plate 18 is mountable inside rear mounting box 10 by means of the pre-drilled holes 12. Inner shield plate 18 is constructed of a material designed to allow light from illuminating means 16 to pass through and is concave in shape, having an outwardly bowed central bulge 20. Preferably, the interior of the box is painted or colored white or other highly reflective hue to increase light reflection and dispersion. Alternatively, the box 10 can be lined inside with a metal foil that reflects and/or disperses light.

Flexible plate 22 fits within the mounting assembly intermediate to inner shield plate 18 and outer shield plate 24. The plate 22 is preferably a transparent or translucent plastic or polymeric material, which commonly has some artwork, wording, or combination thereof, printed or otherwise affixed to the plate. Outer shield plate 24 is concave in shape and outwardly bowed, having a central bulge 26 such that inner central bulge 20 can be received securely. Flexible license plate 22 is forced into an outwardly bowed configuration by being contained intermediately within inner central bulge 20 and outer central bulge 26. Bolts 28 pass through the entire mounting assembly at holes 30 and secure it to the automobile.

The inner plate 18 and the outer plate 24 are preferably made of transparent or translucent plastic or polymeric material. The inner plate 18 can be transparent in order to increase light dispersion, thereby providing more even lighting of the license plate 22.

Figure 2:
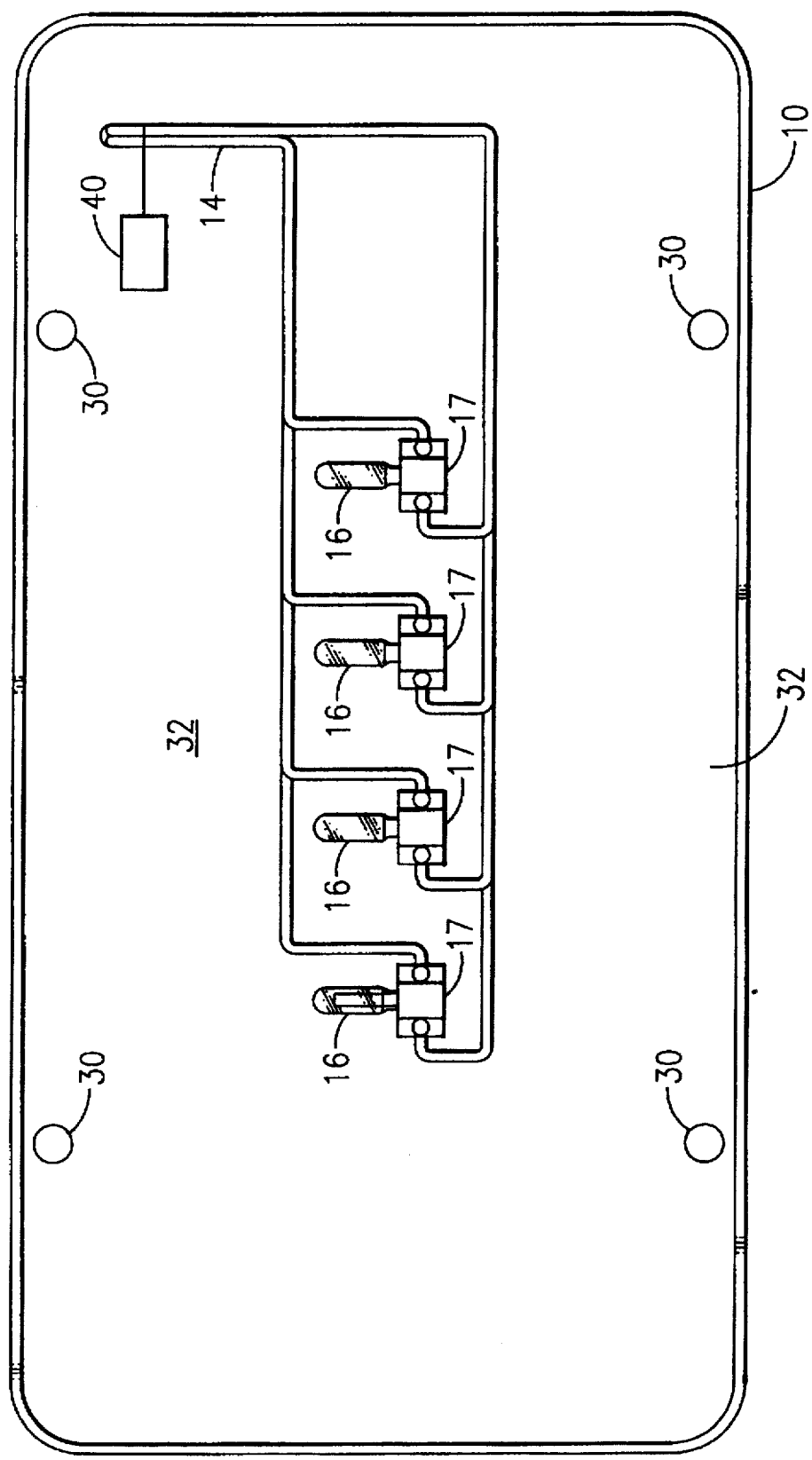
FIG. 2 is a front view of the rear illumination assembly.

FIG. 2 illustrates the rear mounting element 10. Electrical system wires 14 connect the automobile electrical power supply to a plurality of illuminating elements 16. The holes 30 are provided to secure rear mounting element 10 to the automobile. Rear mounting element interior surface 32 is reflective to allow the maximum amount of light produced by illuminating elements 16 to be projected forward.

Figure 3:
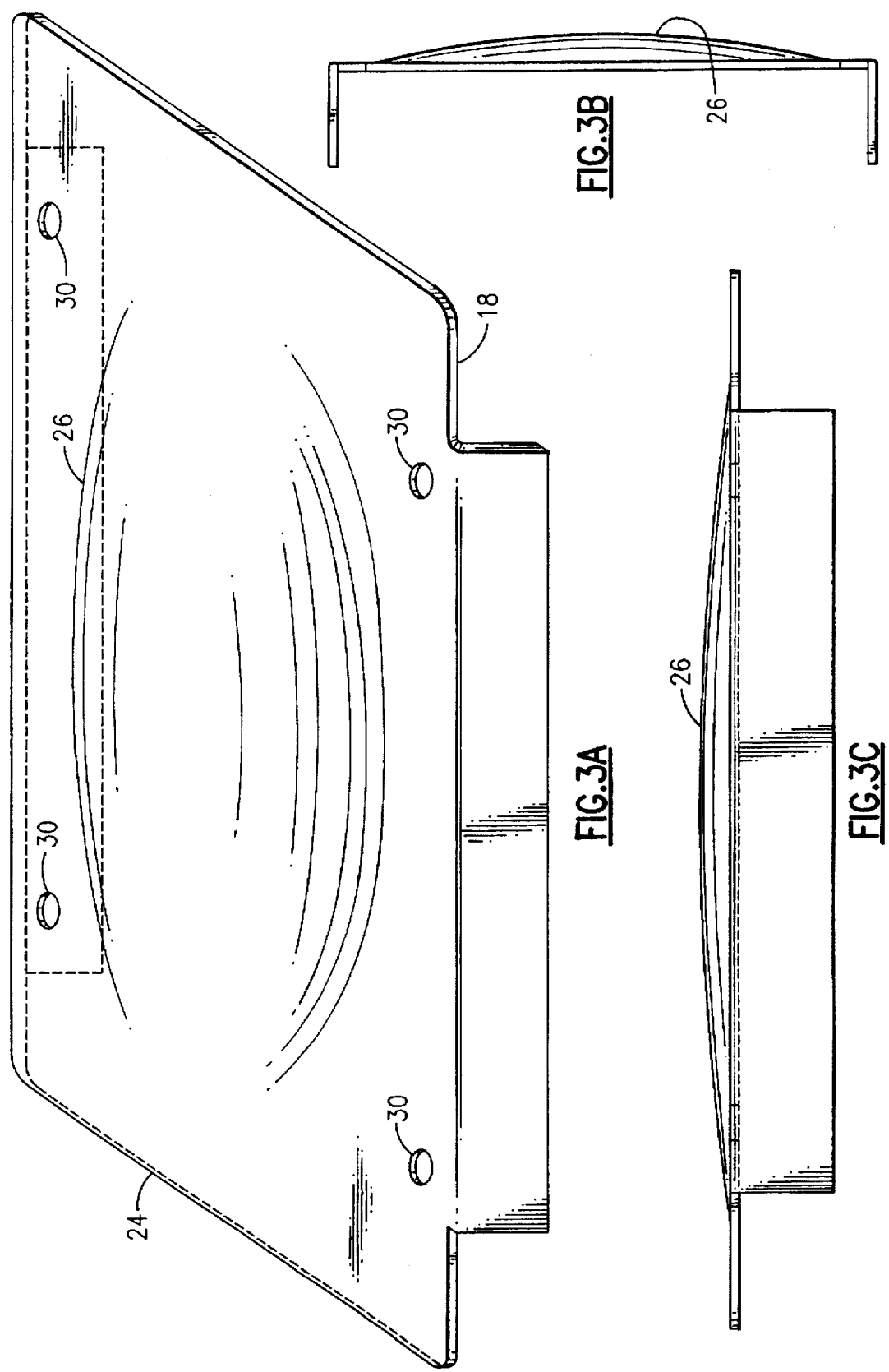
FIGS. 3 A–C are top, side, and front elevational views, respectively, of the transparent plastic shield assembly.

FIG. 3 shows three views of the outer protective shield 24 and the inner protective shield 18 in their assembled configuration. Outer bulge 26 and inner bulge 20 cause the central portion of an intermediate flexible body to bow outward.

Figure 4:
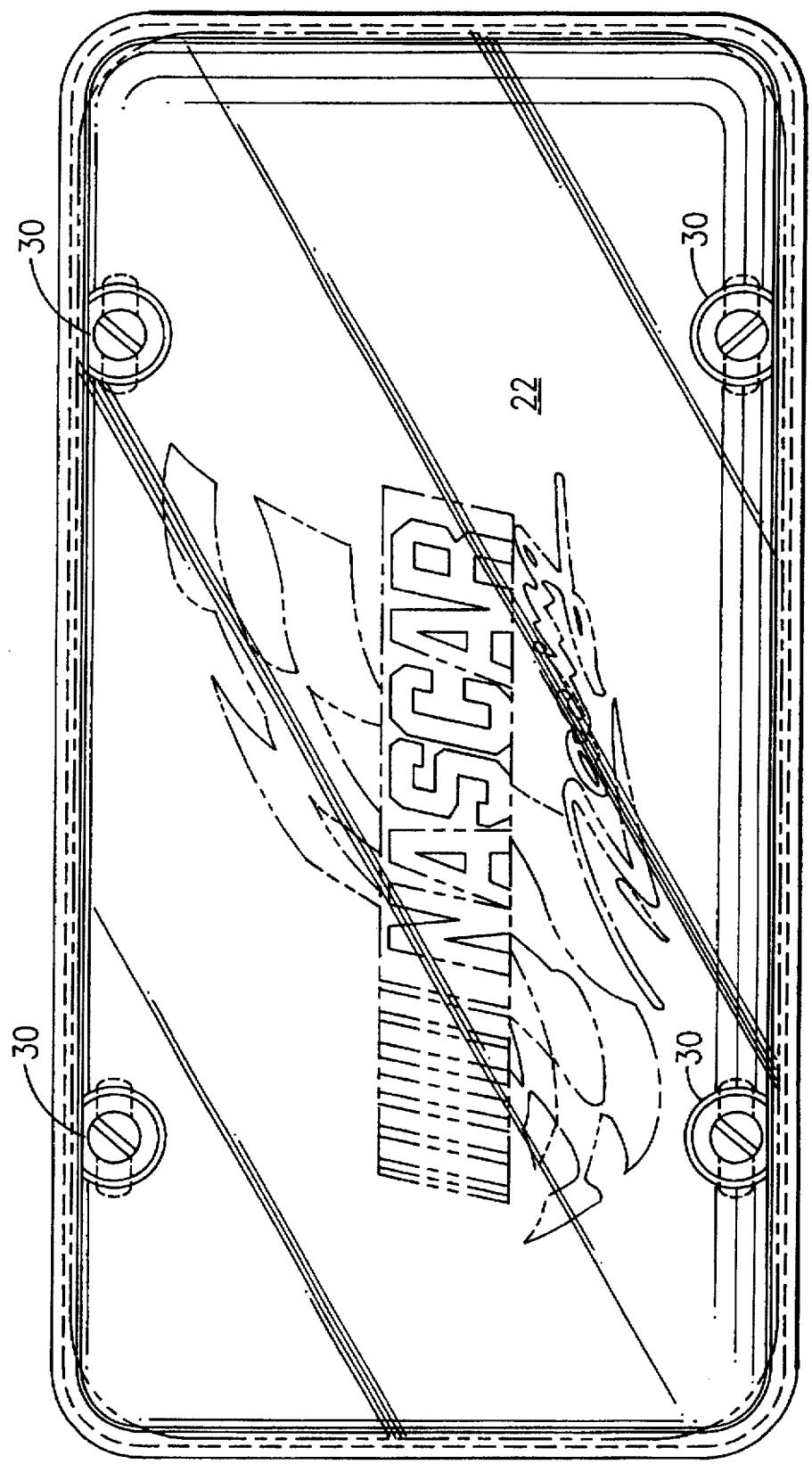
FIG. 4 is a front elevational view of the transparent plastic shield assembly, in closed configuration, mounting a plate.

FIG. 4 illustrates a front view of the entire mounting device as assembled. Flexible license plate 22 is held in place and remains visible to the outside. Holes 30 pass through each component allowing simple attachment to the automobile by the bolts 28.

Optionally, a relay or delay switch 40 can be integrated into the wiring 14 which can control the lights. For example, switch 40 can cause the lights 16 to blink or, if different colored lights 16 are used, switch 40 can cause different lights to be turned on and off in a sequence or randomly.

An advantage of the present invention is that the hot spots associated with prior license plate illuminators is eliminated by the convex bowed shield 24, which evens out the light dispersion from light bulbs 16. The white or other reflective coating on the inner surface of the rear element 10 additionally reflects light back toward the plate 22 and increases light dispersion. The bowed shield 24 provides increased structural strength against objects from the road striking the shield 24 over a flat configuration.

I claim:

1. An automobile display plate protector and display assembly capable of being mounted on an automobile, the automobile having at least two pre-drilled threaded holes defined therein, the assembly comprising:

a rear mounting box having a first end and a second end, the first end having at least two holes defined therein, the at least two holes in alignment with the pre-drilled threaded holes on the automobile;

at least one illumination means mounted within the rear mounting box;

means for providing electrical power to the at least one illumination means;

an inner shield plate sized to fit inside the rear mounting box, the inner shield plate having a first side and a second side, the first side extending inside the rear mounting box, the second side extending inside the rear mounting box, the inner shield plate having at least two holes defined therein that align with the at least two holes in the rear mounting box, the inner shield plate having a convex central bulge defined therein, the first side and the second side extending inside the rear mounting box to establish a space between the illuminating means and the central bulge;

an outer shield plate sized to fit onto the second end of the rear mounting box, the outer shield plate enclosing the inner shield plate, the outer shield plate having a convex central bulge, the outer shield plate having at least two holes defined therein that align with the at least two holes in the inner shield plate;

a flexible display plate sized to fit between the inner shield plate and the outer shield plate and sized to be enclosed therein, the flexible display plate conforming to the shape of the convex central bulge on the inner shield plate and the convex central bulge on the outer shield plate, the flexible display plate having at least two holes defined therein that align with the at least two holes in the inner shield plate and the at least two holes in the outer shield plate; and at least two bolts extending through the outer shield plate, the flexible display plate, the inner shield plate, and the rear mounting box, the at least two bolts being capable of engaging the at least two pre-drilled threaded holes.

2. The assembly of claim 1, wherein said illumination means may receive electrical power directly from the automobile electrical system.

3. The assembly of claim 1, wherein said illumination means may receive electrical power directly from a separate battery.

4. The assembly of claim 1, wherein said outer shield plate is transparent, thereby allowing the license plate to be viewed.

5. The assembly of claim 1, wherein said inner and outer shield plates are constructed of a plastic material.

6. The assembly of claim 1, wherein the rear mounting box has an inside reflective surface.

7. The assembly of claim 6, wherein said reflective surface within said box is a light color paint.

8. The assembly of claim 1, wherein said reflective surface inside said box is metal foil.

9. The assembly of claim 1, wherein the inner shield plate is translucent.

10. The assembly of claim 1, wherein the inner shield plate is transparent.

* * * * *